United States Patent [19]

Piejko et al.

[11] Patent Number: 4,902,745
[45] Date of Patent: Feb. 20, 1990

[54] RUBBER-LIKE THERMOPLASTIC POLYMER MIXTURES

[75] Inventors: Karl-Erwin Piejko, Gladbach; Otto Billinger, Linz; Lothar Meier, Sprockhoevel; Christian Lindner, Cologne; Karl-Heinz Ott, Leverkusen, all of Fed. Rep. of Germany

[73] Assignee: Bayer Aktiengesellschaft, Leverkusen-Bayerwerk, Fed. Rep. of Germany

[21] Appl. No.: 283,464

[22] Filed: Dec. 12, 1988

[30] Foreign Application Priority Data

Dec. 22, 1987 [DE] Fed. Rep. of Germany ....... 3743488

[51] Int. Cl.⁴ .................. C08L 51/04; C08L 51/06
[52] U.S. Cl. .......................... 525/80; 525/83; 525/84; 525/85; 525/71; 525/86
[58] Field of Search ............ 525/80, 83, 84, 85, 525/86, 71

[56] References Cited

U.S. PATENT DOCUMENTS 4,511,695  4/1985  Lindner et al. .................. 525/86

OTHER PUBLICATIONS

Abstract of Japanese Patent 60-192,954, 10/85, Yusa et al.

Primary Examiner—Allan M. Lieberman
Attorney, Agent, or Firm—Connolly and Hutz

[57] ABSTRACT

Soft polymer mixtures of
(a) 10 to 50 parts by weight of a graft polymer obtained from a particulate, highly cross linked diene or alkyl acrylate rubber and graft polymerized alkyl methacylate, acrylonitrile, styrene, alkyl acrylate or mixtures thereof and
(b) 90 to 50 parts by weight of a partly cross-linked, particulate, rubber-like copolymer of acrylonitrile and/or methyl methacrylate and $C_1$ to $C_8$ alkyl acrylate having a gel content of from 60 to 99% by weight and an average particle diameter ($d_{50}$) of from 0.1 to 0.6 μm, and a process for the preparation of the mixtures and their use for the production of moulded articles.

1 Claim, No Drawings

RUBBER-LIKE THERMOPLASTIC POLYMER MIXTURES

This invention relates to soft, highly elastic polymer mixtures with rubber-like properties which can be thermoplastically processed without additional processing steps such as vulcanisation in the moulding process.

Soft polymer alloys containing graft rubbers with a low rubber content and acrylate rubbers are known in the art (EP-A No. 122 516). These alloys contain considerable quantities of matrix polymer which constitutes the continuous phase and is partly responsible for the cohesiveness and strength of the polymer mixture after shaping. In a graft polymer, for example, the matrix is formed by the graft shell of polymerised resin-forming monomers as well as by the free copolymer of these molecules.

If the quantity of this matrix polymer is reduced and the quantity of highly cross-linked, particulate components is increased, one would normally expect the particles to be held only loosely together (during or after thermoplastic shaping) so that the physical properties would be unsatisfactory.

It has now been found that contrary to expectations, it is possible to obtain polymer mixtures with advantageous properties containing only small quantities of matrix resin if special, highly cross linked rubber particles are used.

This invention therefore relates to polymer mixtures of (a) from 10 to 50 parts by weight, in particular from 10 to 40 parts by weight of a graft polymer of 60 to 85% by weight, in particular from 70 to 85% by weight of a particulate, highly cross linked diene or alkyl acrylate rubber and from 40 to 15% by weight, in particular from 30 to 15% by weight of alkyl methacrylate, acrylonitrile, styrene, alkyl acrylate or mixtures thereof grafted on the said graft polymer and (b) from 90 to 50 parts by weight, in particular from 90 to 60 parts by weight of a partially cross-linked particulate, rubber-like copolymer of from 10 to 35% by weight of acrylonitrile and/or methyl methacrylate and from 90 to 65% by weight of $C_1$ to $C_8$ alkyl acrylate having a gel content of from 60 to 99% by weight, in particular from 75 to 99% by weight, and an average particle diameter ($d_{50}$) of from 0.1 to 0.6 $\mu$m, in particular from 0.1 to 0.3 $\mu$m.

These mixtures are thermoplastically processible moulding compounds which have rubber-like properties, in particular they are flexible and stretchable.

Polymers (a) and (b) are known in principle.

Graft polymers (a) according to the invention may be inter alia emulsion polymers with a particulate structure. They consist of a particulate rubber (diene rubber or alkyl acrylate rubber) with a gel content above 80% by weight and average particle diameters ($d_{50}$) of from 0.08 to 0.7 $\mu$m as graft basis on which monomers such as alkyl (meth)acrylate, styrene or acrylonitrile are graft-polymerised.

Examples of diene rubbers include polybutadiene, polyisoprene and copolymers of butadiene with up to 35% by weight of comonomers such as styrene, acrylonitrile, methyl methacrylate or $C_1$ to $C_6$ alkyl acrylate. They may be produced by aqueous radical emulsion polymerisation. Examples of acrylate rubbers include cross-linked, particulate emulsion copolymers of $C_1$ to $C_6$ alkyl acrylates, in particular $C_2$ to $C_6$ alkyl acrylates, optionally mixed with up to 15% by weight of comonomers such as styrene, methyl methacrylate, butadiene, vinyl methyl ether, acrylonitrile and at least one polyfunctional, cross-linking comonomer such as divinyl benzene, glycol-bis-acrylates, bisacrylamides, phosphoric acid triallyl ester, citric acid tris-allyl ester, allyl esters of acrylic acid and methacrylic acid or triallyl cyanurate, and triallyl isocyanurate. The acrylate rubbers may contain up to 4% by weight of the cross-linking comonomers.

Mixtures of diene rubbers and alkyl acrylate rubbers and rubbers which have a core-shell structure (e.g. a diene rubber core and an acrylate shell or an acrylate rubber core and a diene rubber shell) are also suitable. Rubber particles composed of core and shell are preferred. All the rubbers must, of course, be present in the form of small, discrete particles. Preferred graft polymerised monomers consist of methyl methacrylate optionally containing up to 50% by weight of $C_1$ to $C_6$ alkyl acrylate, acrylonitrile or styrene.

The graft polymers (a) may be prepared by producing an emulsion of the required rubber particles in a first stage by emulsion polymerisation and then polymerising vinyl monomers by radical polymerisation in the presence of the rubber emulsion in a second stage in known manner so that at least a proportion of the monomers is chemically bound to the rubber (=grafted). The quantity of grafted polymer may be determined by measuring the degree of grafting or the grafting yield. In the context of this invention, the reaction products of the polymerisation of vinyl monomers in the presence of the rubber emulsion are regarded as the graft polymers, regardless of the degree of grafting. Graft polymers (a) according to this invention preferably have a very high grafting yield which is achieved, for example, by using highly active redox initiators.

Polymers (b) according to this invention are partially cross-linked rubber-like interpolymers of (b1) 10 to 35 parts by weight of acrylonitrile and/or methyl methacrylate and (b2) 90 to 65 parts by weight of alkyl acrylate, in particular $C_3$ to $C_8$ alkyl acrylate, and 0.05 to 5% by weight, based on the sum of (b1)+(b2), of a polyfunctional, copolymerisable vinyl or allyl compound, preferably triallyl cyanurate, triallyl isocyanurate, vinyl ethers of polyols, vinyl or allyl esters of polyfunctional carboxylic acids and bisacrylamides of diamines. The polymers (b) have gel contents of from 60 to 99% by weight, in particular above 70% by weight, and average particle diameters ($d_{50}$) of from 0.1 to 0.6 $\mu$m.

Polymers (b) may be prepared in a known manner by radical, aqueous emulsion polymerisation in the presence of anionic, surface active substances in the temperature range of from 40° to 95° C., in particular from 55° to 80° C.

Preferred polymer mixtures according to the invention contain graft polymers (a) 70 to 85% by weight of cross-linked rubber particles with graft polymerised methyl methacrylate mixed with up to 20% by weight of alkyl acrylate. Preferred polymers (b) are highly cross-linked inter polymers of from 15 to 35% by weight of acrylonitrile and from 85 to 65% by weight of alkyl acrylate, in particular butyl acrylate.

The soft polymer mixtures may be prepared from the polymers which have been isolated from their emulsions by coagulation or direct drying (spray drying) and purified by mixing these polymers, e.g. in screws or kneaders. The aqueous emulsions of (a) and (b) are preferably first mixed together in the required quantities (according to their polymer content) and the emulsion mixture (latex mixture) is then coagulated or dried directly. The products obtained are moulding compounds suitable for further processing to produce plastic articles.

Moulding compounds of the mixtures according to the invention have many of the properties of conventional vulcanised rubbers or thermoplastic elastomers. Their special combination of capacity for elongation, softness and strength should be particularly mentioned. These properties may be adjusted by adjusting the proportions of (a) and (b) in the mixture and the cold strength can also be influenced by suitable adjustment of these proportions. Whereas mixtures based on diene rubbers have advantageous properties at low temperatures, moulding compounds based on acrylate rubbers have excellent age resistance. Since components (a) and (b) are highly cross-linked polymers, the moulding compounds are relatively free from volatile or migrating impurities, compared with known cross-linked moulding compounds. The compounds according to the invention are particularly resistant to the usual technical solvents. They are suitable for the production of coatings, sealing compounds, films, damping materials and rubber articles.

EXAMPLES (1) Graft Polymers (a) put into the Process (1.1) Graft polymer of 80 parts by weight of a coarse particled polybutadiene having an average particle diameter ($d_{50}$) of 0.4 μm and a gel content (in toluene) of 89% by weight of the graft basis and 20 parts by weight of graft polymerised monomers of 90% by weight of methyl methacrylate and 10% by weight of n-butyl acrylate, prepared by radical emulsion polymerisation of a mixture of methyl methacrylate and n-butyl acrylate in the presence of the polybutadiene latex. The graft polymer latex obtained, which has a polymer solids content of 35% by weight, is used directly for the preparation of the mixtures.

(1.2) Graft polymer prepared analogously to (1.1) from 70 parts by weight of polybutadiene and 30 parts by weight of methyl methacrylate/n-butyl acrylate (90/10). The polymer content of the latex is 35% by weight.

(1.3) Graft polymer of 70 parts by weight of a coarse particled acrylate rubber having an average particle diameter ($d_{50}$) of 0.52 μm and a gel content (in dimethyl formamide) of 95% by weight (prepared by cross-linking copolymerisation of n-butyl acrylate/triallyl cyanurate according to EP-A No. 34 748) and 30 parts by weight of graft polymerised monomers of 90% by weight of methyl methacrylate and 10% by weight of n-butyl acrylate, prepared by radical emulsion polymerisation. The graft polymer latex obtained has a polymer solids content of 37% by weight and is used in latex form like in (1.1) and (1.2) for the preparation of the mixtures (3).

(2) Rubbers (b) put into the Process (2.1) Rubbers according to the invention

A solution of 2.5 parts by weight of the sodium salt of $C_{14}$ to $C_{18}$ alkyl sulphonic acids and 750 parts by weight of water is introduced into a reactor. After the solution has been heated up to 70° C., 70 parts by weight of monomer solution A are added and polymerisation is initiated by the addition of a solution of 3.5 parts by weight of potassium peroxy disulphate in 50 parts by weight of water. The remainder of solution A as well as solution B are introduced into the reactor at a uniform rate at 70° C. over a period of 6 hours and polymerisation is completed within 4 hours. A latex having a polymer solids content of 37% by weight, an average particle diameter ($d_{50}$) of 0.18 μm and a gel content (in DMF) of 98% by weight is obtained.

| Solution A: | 1,105 parts by weight of | n-butyl acrylate |
| | 7 " | triallyl cyanurate |
| | 474 " | acrylonitrile |
| Solution B: | 30 parts by weight of | the sodium salt of $C_{14}$ to $C_{18}$ alkyl sulphonic acid |
| | 1,790 " | water. |

(2.2) Rubber for Comparison

A solution of 5 parts by weight of the sodium salt of $C_{14}$ to $C_{18}$ alkyl sulphonic acid and 1,030 parts by weight of water is introduced into a reactor. After the solution has been heated to 70° C., 80 parts by weight of monomer solution A are added and polymerisation is initiated by the addition of a solution of 4 parts by weight of potassium peroxy disulphate in 100 parts by weight of water. The remainder of solution A and solution B are introduced into the reactor at a uniform rate at 70° C. over a period of 5 hours and polymerisation is completed within 4 hours. A latex having a polymer solids content of 30% by weight, an average particle diameter ($d_{50}$) of 0.20 μm and a gel content (in DMF) of 95% by weight is obtained.

| Solution A: | 995 parts by weight of | n-butyl acrylate |
| | 5 " | triallyl cyanurate |
| Solution B: | 25 parts by weight of | the sodium salt of $C_{14}$ to $C_{18}$ alkyl sulphonic acids |
| | 700 " | water. |

(3.) Preparation and Properties of the Polymer Mixtures

The latices (1) are mixed together in such proportions that the latex solids contents shown in Table 1 are observed. After stabilization with 1% by weight of a phenolic antioxidant (based on 100 parts by weight of solid), the latex mixture is coagulated with aqueous magnesium sulphate solution, washed and dried at 70° C.

TABLE 1

Composition of the polymer mixtures (in parts by weight)

| Experiment No. | Graft Polymers Type | | | Rubbers Type | |
|---|---|---|---|---|---|
| | 1.1 | 1.2 | 1.3 | 2.1 | 2.2 |
| 3.1 | 25 | | | 75 | |
| 3.2 | | 25 | | 75 | |
| 3.3 | | | 25 | 75 | |
| 3.4 | 30 | | | 70 | |
| 3.5 | | | 30 | 70 | |
| 3.6 (Comparison) | 30 | | | | 70 |

Polymer mixtures 3.1 to 3.6 are compounded on a roller for 5 minutes at 230° C. with the addition of 2.8% by weight of ester wax as processing aid. The rolled sheet obtained is then compression moulded at 240° C. to produce test samples. The properties are shown in Table 2.

TABLE 2

| Experiment No. | Tensile Strength (MPA) | Elongation $E_R$ (%) | Tear Propagation Resistance (MPA) | Shore Hardness A/D | Cold Strength (°C.) |
| --- | --- | --- | --- | --- | --- |
| 3.1 | 14 | 305 | 28 | 60/11 | −20 |
| 3.2 | 13 | 272 | 30 | 72/17 | −10 |
| 3.3 | 13.5 | 320 | 22 | 50/0 | −5 |
| 3.4 | 13 | 286 | 25 | 68/11 | −20 |
| 3.5 | 14 | 280 | 24 | 55/5 | −6 |
| 3.6 | 9 | 92 | 23 | 13/0 | ./. |

Test Methods

| | |
| --- | --- |
| Tensile strength | according to DIN 53 455 |
| Elongation | according to DIN 53 455 |
| Tear propagation resistance | according to DIN 53 515 |
| Shore hardness | according to DIN 53 505 |
| Cold strength | according to DIN 53 372 |
| | (falling hammer method) |

We claim:

1. Soft polymer mixtures of
   (a) from 10 to 50 parts by weight of a graft polymer containing 40 to 15% by weight of graft polymerized alkyl methacrylate, acrylonitrile, styrene, alkyl acrylate or mixtures thereof grafted onto 60 to 85% by weight of the graft of a particulate highly cross-linked diene or alkylacrylate rubber with a gel content above 80% by weight and a particle size of 0.08 to 0.7 μm, and
   (b) from 90 to 50 parts by weight of a partially cross-linked particulate, rubber-like copolymer of 10 to 35% by weight of acrylonitrile and/or methyl methacrylate and 90 to 65% by weight of $C_1$ to $C_8$ alkyl acrylate, having a gel content of from 60 to 90% by weight and an average particle diameter ($d_{50}$) of from 0.1 to 0.6 μm.

* * * * *